United States Patent [19]

Hatakeyama et al.

[11] Patent Number: 5,702,666
[45] Date of Patent: Dec. 30, 1997

[54] METHOD FOR MAKING SHEET BUTTON PANEL ASSEMBLY

[75] Inventors: Yoshiharu Hatakeyama; Yukitomo Yuhara, both of Tokyo, Japan

[73] Assignee: Yoshida Kogyo Co., Ltd., Tokyo, Japan

[21] Appl. No.: 449,388

[22] Filed: May 24, 1995

[30] Foreign Application Priority Data

Feb. 14, 1995 [JP] Japan ................................. 7-025493

[51] Int. Cl.⁶ ........................... B29C 45/14; B29C 51/02
[52] U.S. Cl. ................... 264/544; 264/251; 264/296; 264/322
[58] Field of Search ................... 264/250, 259, 264/320, 266, 255, 251, 296, 509, 544, 319, 322

[56] References Cited

U.S. PATENT DOCUMENTS

| | | | |
|---|---|---|---|
| 2,979,246 | 4/1961 | Liebeskind | 264/251 |
| 3,342,915 | 9/1967 | Wanderer | 264/544 |
| 3,511,902 | 5/1970 | Santangelo | 264/251 |
| 4,191,039 | 3/1980 | Bradbury | 264/544 |
| 4,243,626 | 1/1981 | Prete | 264/251 |
| 4,666,544 | 5/1987 | Whiteside et al. | 264/544 |
| 5,336,460 | 8/1994 | Hettinga | 264/251 |
| 5,340,525 | 8/1994 | Czernik | 264/266 |
| 5,401,457 | 3/1995 | Valyi | 264/266 |
| 5,447,679 | 9/1995 | Eigen et al. | 264/544 |

*Primary Examiner*—Angela Y. Oritz

[57] ABSTRACT

A method for making a sheet button panel assembly that can avoid wrinkles at boundaries of embossments and damages on a printed face of a decorative sheet. The method includes the steps of embossing the decorative sheet where only one mold contacts the portions of the decorative sheet to which embossments are formed and where the decorative sheet is heated, and injecting resin into a cavity to form a sheet button panel assembly in which the decorative sheet and the resin are made united. When embossing the decorative sheet, the decorative sheet is softened by heating and is less restricted because only one mold contacts the sheet. The decorative sheet is free of wrinkle and damage, in particular, no damages in printed face of the decorative sheet.

8 Claims, 12 Drawing Sheets

METHOD FOR MAKING SHEET BUTTON PANEL ASSEMBLY

CROSS-REFERENCE TO RELATED APPLICATION

This application claims priority benefits under 35 U.S.C §119 of Japanese application Ser. No. 7-25,493, filed Feb. 14th, 1995, the entire disclosure of which is incorporated herein by reference.

BACKGROUND OF THE INVENTION

1. Field of the Invention

This invention relates to a method of making a sheet button panel assembly in which a decorative sheet is embossed and synthetic resin is then injected onto the embossed decorative sheet, thereby forming a resin molded article combined with the decorative sheet.

Such a sheet button panel assembly constitutes a button switch member in which plural touch portions of multiple button switches are integrated and formed in a panel shape. In particular, the sheet button panel assembly constitutes a panel for controlling switches by pushing embossed portions of the decorative sheet and operating the switches through windows formed behind the sheet.

2. Description of Related Art

As a conventional method for making such a sheet button panel assembly, a technique disclosed in, for example, Japanese Patent Publication 4-11,094 has generally been known. In this technique, a decorative sheet is embossed by pressing the sheet with two molds from both sides; synthetic resin is injected into a space around the embossed portions to produce resin molded articles, in which the decorative sheet and the resin are united, with windows formed behind the embossed portion of the sheet.

In the method for making the sheet button panel assembly above, however, the two molds for embossing the sheet merely press the decorative sheet when the decorative sheet is to be embossed. Therefore, excessive force from the press is exerted to the boundaries between the embossed portions and the flat portions, thereby creating wrinkles at the boundaries in some occasions, and raising a problem that the products lack handsome appearance as required for commercial goods.

With the method above, the printed face of the decorative sheet may be damaged when the printed face compulsively contacts the mold, because the two molds have to clamp the decorative sheet to emboss it.

SUMMARY OF THE INVENTION

It is an object of the invention to provide a method for making a sheet button panel assembly capable of avoiding the decorative sheet from being wrinkled at its embossment boundaries and of preventing the printed face of the decorative sheet from being damaged.

The foregoing object is accomplished with the method for making a sheet button panel assembly including the steps of: embossing a decorative sheet in contact with either a first mold or a second mold while the decorative sheet is heated after inserting the decorative sheet between the first and second molds; and forming a united article composed of the decorative sheet and a molded member formed by injecting resin material into a cavity located between the first and second molds. The decorative sheet is heated thereby becoming soft when embossed, so that no wrinkle would be created around the boundaries. The printed face of the sheet would receive no damage because only one mold contacts the decorative sheet and the decorative sheet is therefore embossed without excessive force.

The embossment of the decorative sheet can be made by contacting either the first mold or the second mold to the face on which no decorative printing is made. Since the mold does not contact directly to the printed face of the decorative sheet, the printed face is surely prevented from being damaged. A heater provided at least at either the first mold or the second mold can heat the decorative sheet. The heater enables heating and embossing steps to run without a break and makes the apparatus for conducting these steps compact. An air passage can be formed at least in either first mold or the second mold, so that hot air can indirectly heat the decorative sheet. Heating of air allows heating temperature to be readily adjusted and prevents the decorative sheet from receiving excessive heat.

BRIEF DESCRIPTION OF THE DRAWINGS

The above and other objects and features of the invention are apparent to those skilled in the art from the following preferred embodiments thereof when considered in conjunction with the accompanied drawings, in which.

DETAILED DESCRIPTION OF THE PREFERRED EMBODIMENTS

Referring to the drawings in detail, in particular, to FIGS. 1 to 4, a method for making a sheet button panel assembly according to a first preferred embodiment of the invention is shown. In the first embodiment, a heater to heat decorative sheets is installed in a mold, and air is used as a heating medium.

Figure 1:
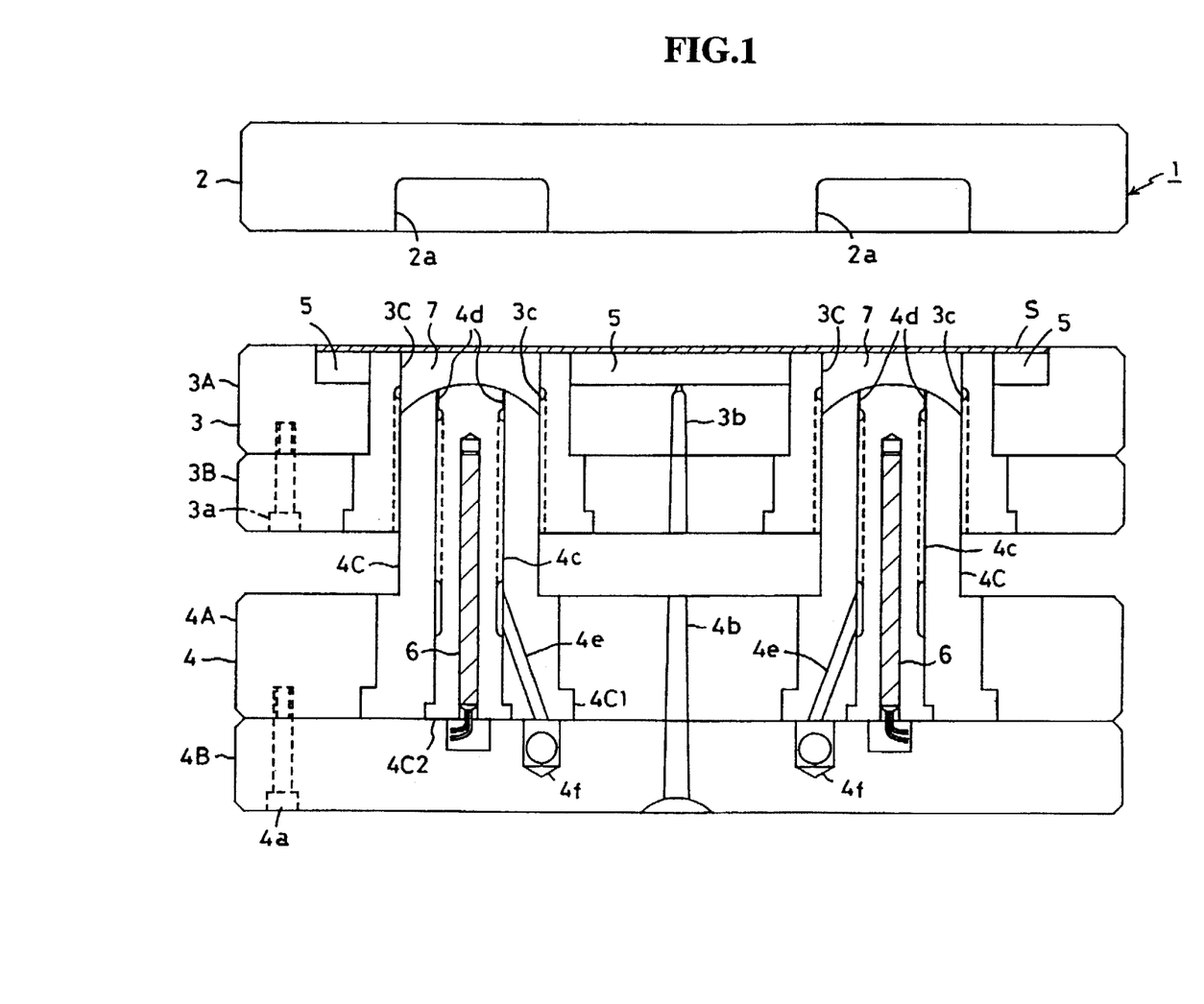
FIGS. 1, 2, 3, and 4 are side cross sections showing a metal mold used in a method for making a sheet button panel assembly according to the first embodiment of the invention.

As shown in FIG. 1, a metal mold 1 includes a cavity plate 2 as a first mold, a movable plate 3 serving as a part of a second mold, and a core plate 4 also serving as a part of the second mold for embossing a decorative sheet S in association with the cavity plate 2. The movable plate 3 has a cavity 5 or a space, which forms a space for injecting a resin therein.

The cavity plate 2 has escaping cavities 2a for escaping a decorative sheet S when the decorative sheet S is being embossed at the parting line between the cavity plate 2 and the movable plate 3. That is, when the decorative sheet S is embossed, the cavity plate 2 does not contact the surface of the decorative sheet S at the areas where the sheet S is embossed.

The movable plate 3 includes a first molding plate 3A for supporting the decorative sheet S, a second molding plate 3B unitedly fixed to the first molding plate 3A with bolts 3a, and a pair of sleeves 3C, 3C penetrated and incorporated in the first and second molding plates 3A, 3B. The sleeves 3C, 3C both have the same constitution respectively. Each sleeve 3C has a substantially cylindrical shape with a flange at the end. Each sleeve 3C has a hole located at the center extending in an axial direction and from one end to the other end. The first molding plate 3A is formed with holes for penetration of the sleeves 3C, 3C. The cavity 5 is surrounded by the tips of the sleeves 3C, 3C and a recess located at the parting line of the first molding plate 3A. A sprue 3b for introducing melted resin into the cavity 5 is formed at a center of the first and second molding plates 3A, 3B. The sleeve 3C has plural grooves at its inner round surface of the hole, and the grooves serve as air passages 3c.

The core plate 4 includes a pair of cores 4C, 4C in the shape of posts respectively inserted into the sleeves 3C, 3C of the movable plate 3, a first molding plate 4A for supporting the bases of the cores 4C, 4C, and a second molding plate 4B secured to a face of the first molding plate 4A by bolts 4a. A sprue 4b for introducing the melted resin is formed, as in the same manner as for the movable plate 3, at the center of the first and second molding plate 4A, 4B so as to penetrate them.

Each core 4C includes an outer member 4C1 in a cylindrical shape having a hollow, and an inner member 4C2 in a cylindrical shape to be fitted into the hollow of the outer member 4C1. Each outer member 4C1 has an outer diameter inserted into the hole of the sleeve 3C when the movable plate 3 comes close to the core plate 4. A heater 6 is provided at the center of the inner member 4C2. Plural grooves are formed on the outer round face of the inner member 4C2 and constitute, at the inner round face of the outer member 4C1, an air passage 4c whose outlets 4d are opened at a tip end of each core 4C. Another air passage 4f for passing air from a compressor not shown and connected to the outside is formed in the second molding plate 4B. Another air passage 4e formed in the outer member 4C1 communicates the air passage 4f with the air passage 4c in the inner member 4C2 in each core 4C.

The decorative sheet S is a thin flexible plastic material film. On the front side of the sheet S, patterns and letters, for example, are printed, and on the back side, electric interconnections or the like may be formed using conductive ink. The resin injected in the cavity 5 in the movable plate 3 and the decorative sheet S are united and constitute a sheet button panel assembly P.

Figure 2:
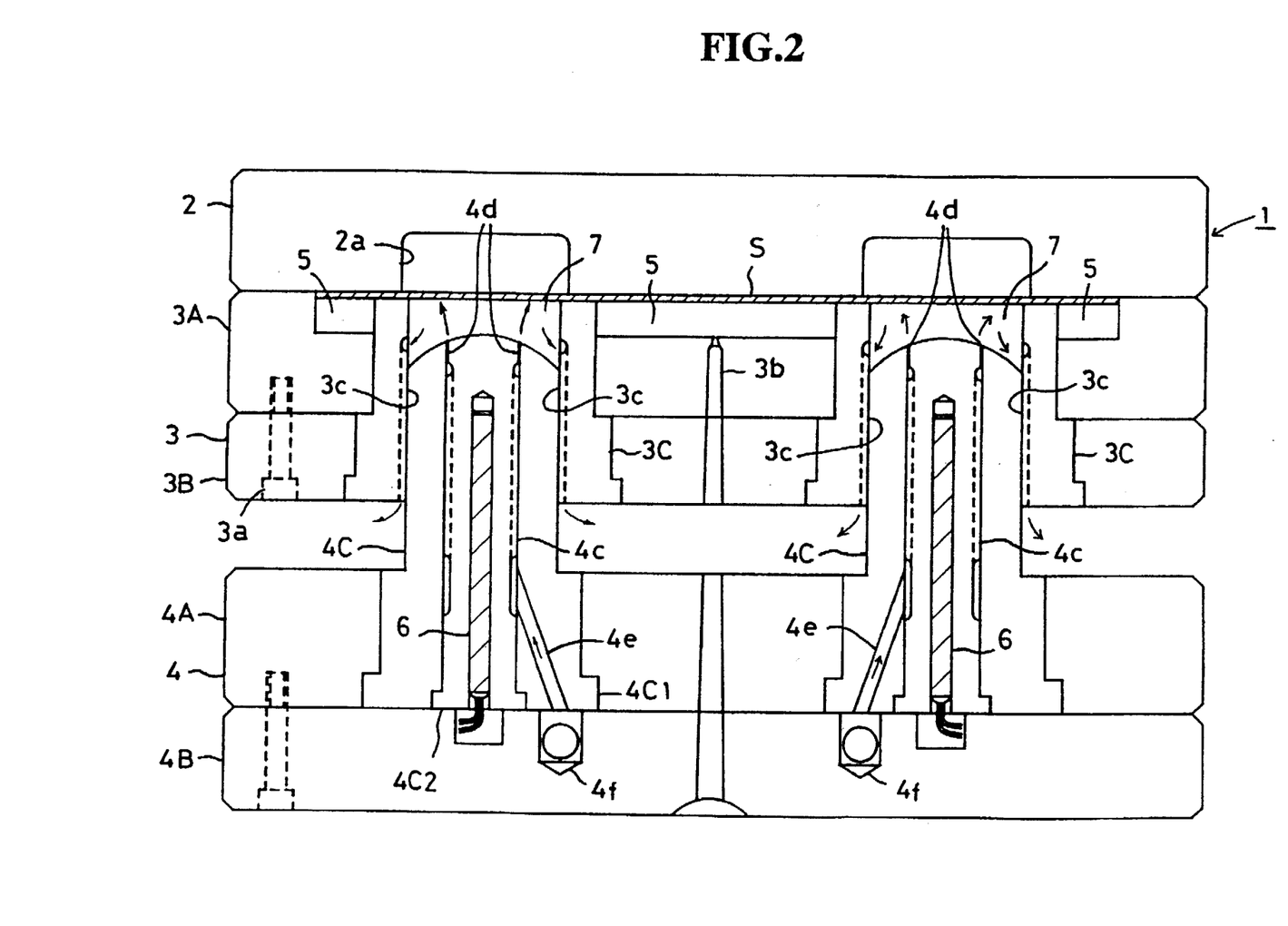

Referring to FIGS. 1 to 4, the method for making the sheet button panel assembly using the metal mold 1 according to the first embodiment is described. First, the decorative sheet S is set on the movable plate 3 as shown in FIG. 1. In this situation, the cavity plate 2 is separated from the movable plate 3, and although the cores 4C, 4C of the core plate 4 are inserted in the sleeves 3C, 3C, the second molding plate 3B of the movable plate 3 and the first molding plate 4A of the core plate 4 are separated. After the decorative sheet S is set on the first molding plate 3A, the heater 6 and the compressor not shown are made to operate for heating the decorative sheet S. The decorative sheet S is clamped by the cavity plate 2 and the movable plate 3 as illustrated in FIG. 2. Upon air distribution from the compressor to the air passage 4f, the air passes through the air passages 4e, 4c. At that time, since the heater 6 is operating, the air passing therethrough receives the heat and blows out of the outlets 4d as a blow of warm air. The warm blow of air strikes one side of the decorative sheet S and is stagnated as hot air at a space 7 on the one side of the decorative sheet S, thereby heating the portion of the decorative sheet S subject to embossing operations.

The air, blown out of the outlets 4d, that heated the decorative sheet S is exhausted outside of the metal mold 1 through the air passages 3c of the sleeves 3C of the movable plate 3. Since the air always circulates, the heat of the heater 6 is taken by this circulating air, so that the heat may not be transferred directly to the decorative sheet S through the core plate 4 or the movable plate 3.

Figure 3:
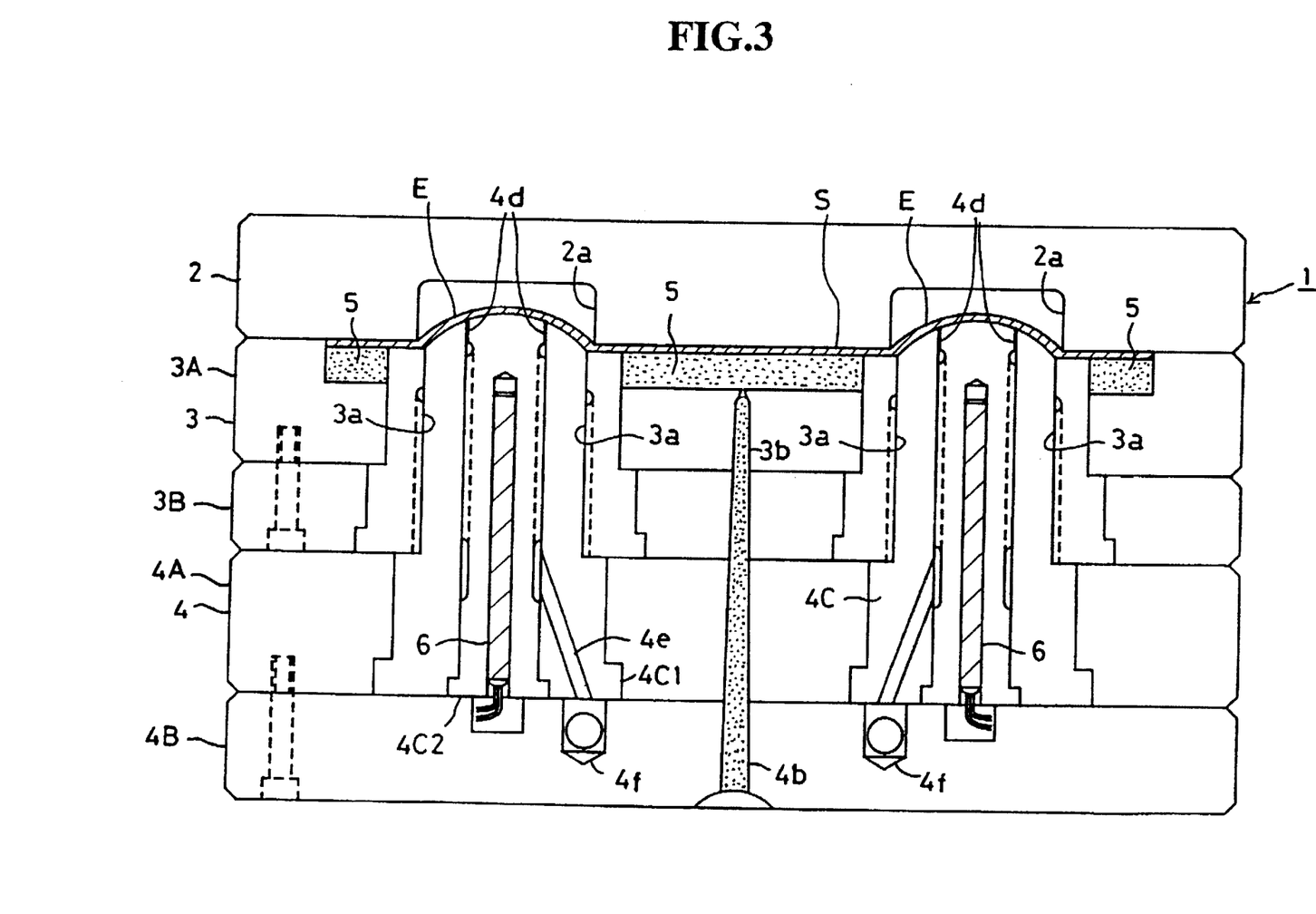

As shown in FIG. 3, then, the embossing step and the resin injection step take place. After heating of the decorative sheet S is completed, heating of the heater 6 and sending of air is stopped. The core plate 4 or the movable plate 3 is made to come close to render the cores 4 further go into the sleeves 3C, thereby projecting the tips of the cores 4 from the movable plate 3. The decorative sheet's portion surrounding the core 4C is fixed by clamping of the sleeves 3C and the cavity plate 2, and therefore, the projected cores 4C push the contact portions only, thereby producing embossments E on the decorative sheet S.

The decorative sheet S is already made soft by heating during heating work as the previous process, so that it is embossed without stress or wrinkle at the periphery of the embossed areas. The embossments E of the decorative sheet S. even though projected toward the cavity plate 2, do not receive any damage because the front face of the embossments E on which printing is made does not directly contact the cavity plate 2 for the escaping space has been formed. When the embossing step ends, a nozzle of the injection molding machine is connected, as the condition is maintained, to the sprue 4b in the core plate 4, and then, resin is injected into the cavity 5 through the sprue 3b.

Figure 4:
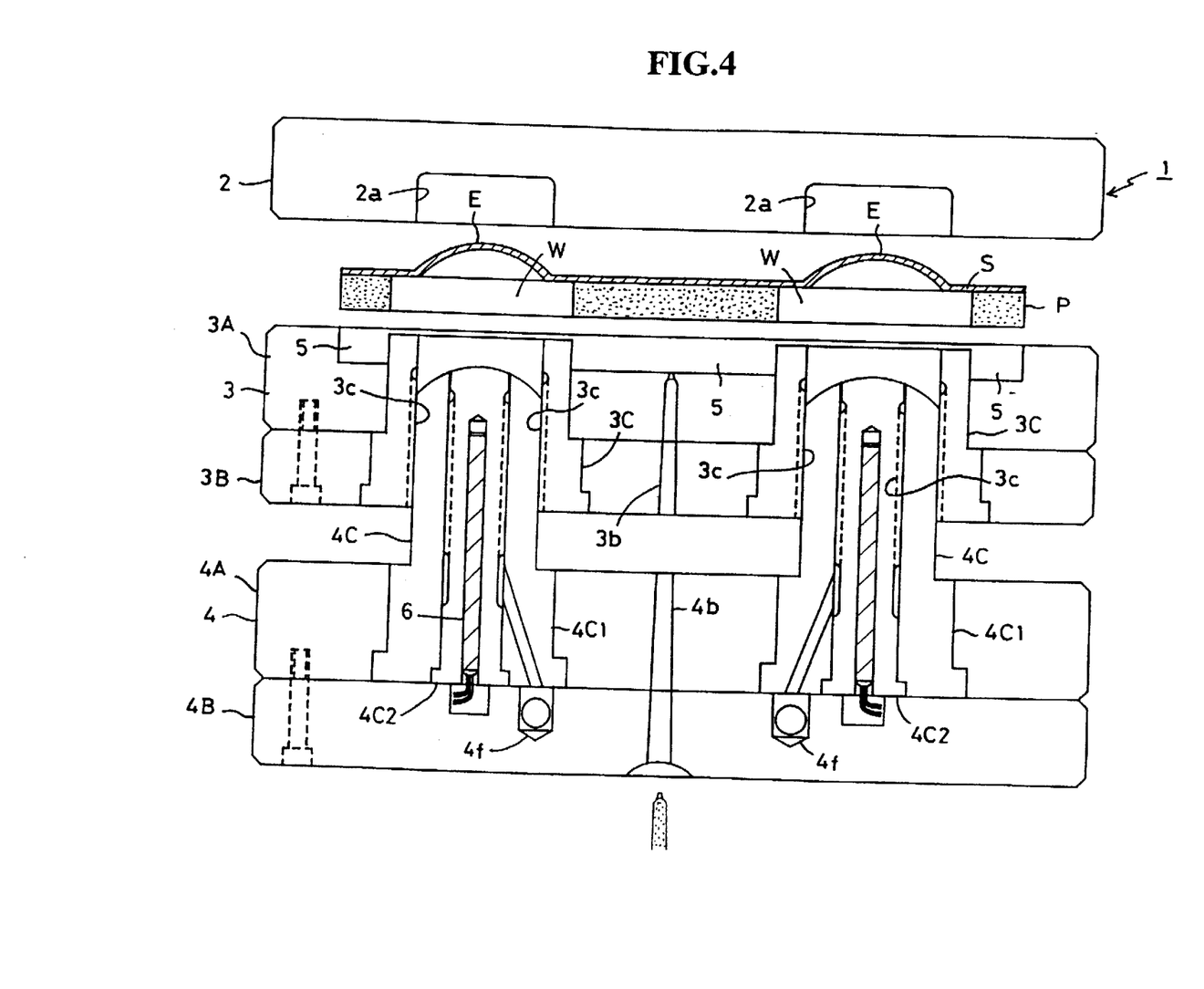

Finally, as shown in FIG. 4, a sheet button panel assembly as a workpiece of injection molding is taken out of the metal mold 1. The resin injected during the previous process contacts the back side of the decorative sheet S and unifies with the back side of the sheet S, and makes a sheet button panel P when cooled to be solidified. The cavity plate 2, the movable plate 3, and the core plate 4 are again separated to expose the decorative sheet S. and the decorative sheet S is pulled out of the movable plate 3 using suckers, for example, to take out the sheet button panel assembly P as the completion of the series of processes. The sheet button panel assembly thus formed makes a resin molded article that has the decorative sheet S on its surface and windows W opened at positions corresponding to the positions of the embossments E.

As described above, with the method for making the sheet button panel assembly according to this embodiment, heating is easily adjustable since the decorative sheet S is heated by the warm air. The decorative sheet S is embossed without rendering the printed face thereof contact the cavity plate 2, so that the surface of the sheet button panel assembly thus formed is surely free from being damaged. Moreover, the heater 6 is incorporated in the metal mold 1 in this embodiment, so that the entire apparatus for producing this panel assembly can be made compact.

Referring to FIGS. 5 to 8, a method for making a sheet button panel assembly according to a second preferred embodiment of the invention is shown. In this second invention, the decorative sheet S is embossed so that recesses on a cavity plate are transferred onto the sheet. FIGS. 5 to 8 show side cross sections of a metal mold for executing the method for making a sheet button panel assembly according to the invention.

Figure 5:
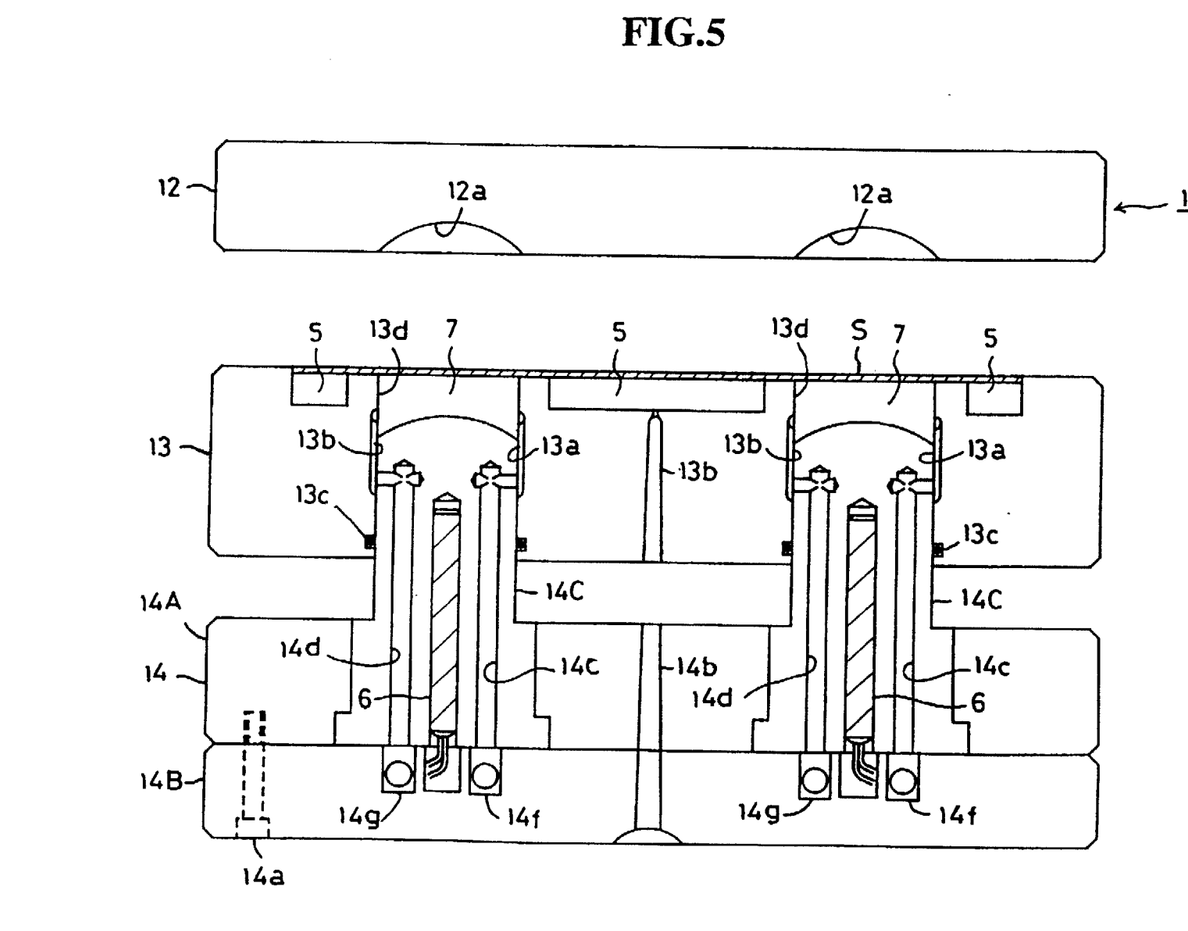
FIGS. 5, 6, 7, and 8 are side cross sections showing a metal mold used in a method for making a sheet button panel assembly according to the second embodiment of the invention.

As shown in FIG. 5, the metal mold 11 includes, as well as the first embodiment, a cavity plate 12 as the first mold, a movable plate 13 constituting a part of the second mold, and a core plate 14. The cavity plate 12 is formed with a pair of recesses 12a, 12a as female molds for embossments formed on the decorative sheet S. The movable plate 13 has a single body structure which is different from the first embodiment. The movable plate 13 has a pair of holes 13d, 13d into which cores 14C, 14C described below are inserted. Grooves serving as a pair of air passages 13a, 13a are formed at the inner round face of the holes 13d, 13d. An O-ring 13c is fitted in the inner round face on a side near to the core plate 14. The movable plate 13 has a cavity 5 formed on a face thereof facing the cavity plate 12. A sprue 13b for introducing melted resin into the cavity 5 is formed at the center of the movable plate 13 so as to communicate with the cavity 5.

The core plate 14 includes a pair of cores 14C, 14C in a post shape to be inserted into the holes 13d, 13d of the movable plate 13, a first molding plate 14A, and a second molding plate 14B. The first and second molding plates 14A, 14B are unitedly secured to each other by bolts 14a. A sprue 14b, penetrating through the first and second molding plates 14A, 14B and communicating the sprue 13b in the movable plate 13 for introducing resin, is formed at the center of the first and second molding plates 14A, 14B. A heater 6 is provided in each core 14C. At least a pair of air passages 14c, 14d are bored so as to surround the heater 6. Those air passages 14c, 14d are in communication with a pair of air passages 14f, 14g bored in the second molding plate 14B.

Figure 6:
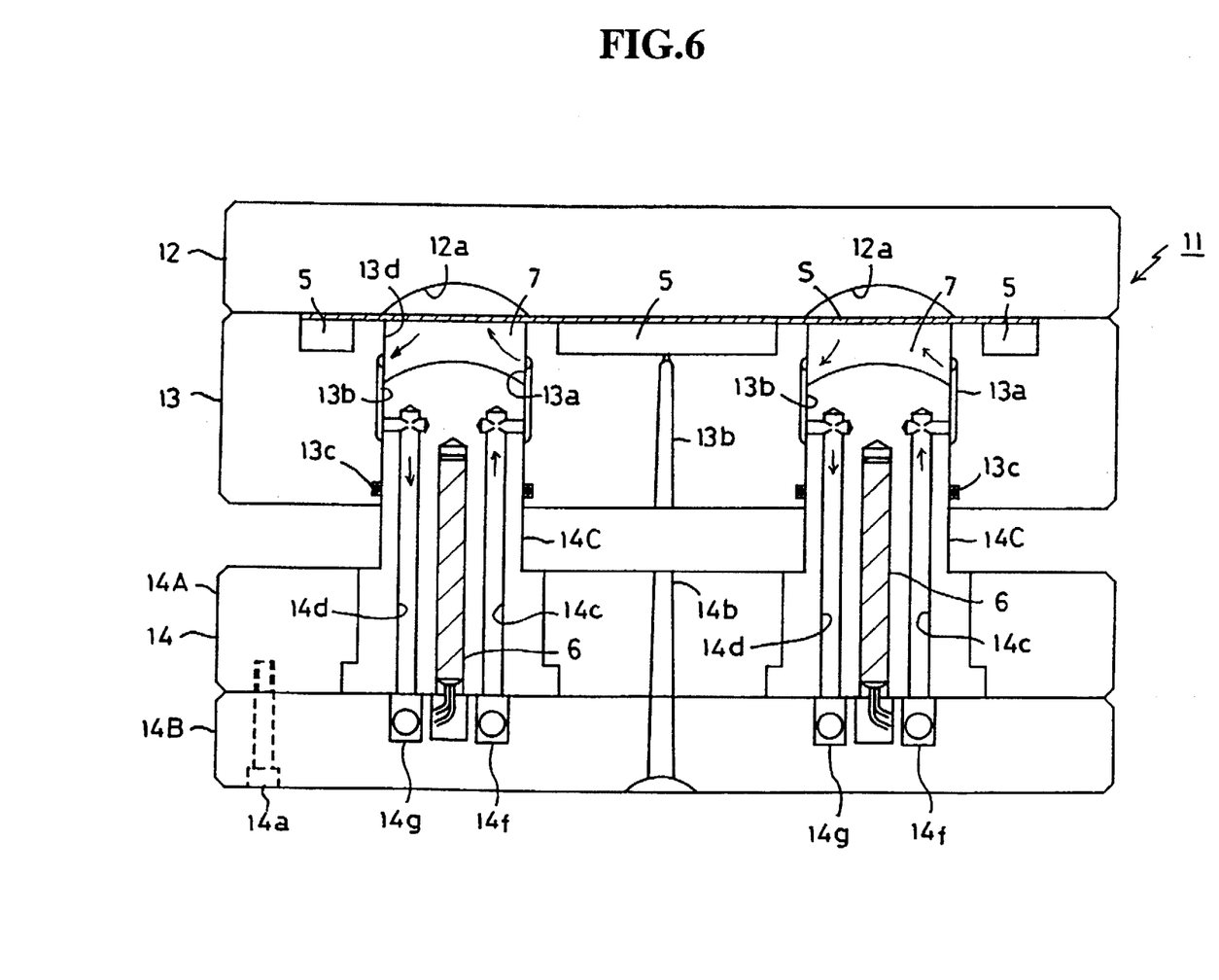

Referring to FIGS. 5 to 8, the method for making a sheet button panel assembly using the metal mold 11 according to this embodiment is described. A decorative sheet S is first set on the movable plate 13 as shown in FIG. 5. Then, the decorative sheet S is heated as shown in FIG. 6. When a compressor, not shown, sends air to the air passage 14f, for instance, while the cavity plate 12 and the movable plate 13 are clamped, the air passes through the air passage 14c in the core 14C and reaches the air passage 13a in the movable plate 13, thereby coming out into a space 7 between the core 14C and the decorative sheet S. At that time, the air is warmed by the heater 6 while passing through the air passage 14c, and becomes warm to heat the portions of the decorative sheet S to be embossed. The air that has heated the decorative sheet S then passes through the other air passage 13b at the holes 13d in the movable plate 13, and is exhausted outside the metal mold 11 after passing through the air passage 14d in the core 14C and the air passage 14g in the second molding plate 14B. Of course, the air can be supplied from the air passage 14g and exhausted from the passage 14f. When this heating process is completed, the embossing step and resin injection step take place shown in FIG. 7. The heater 6 and the compressor for sending air are stopped. As the air passage 14g is closed using a valve provided outside, the cores 14C are made further to go into the holes 13d of the movable plate 13. When the cores 14C reach predetermined positions, the outer peripheral face of the cores 14C close the air passages 13a, 13b to render the air sealed within the space 7. In particular, the O-ring 13c provided at the hole 13d on a side near to the core plate 14 prevents air from leaking out of the space between the core 14C and the hole 13d, so that a highly air tight condition is maintained.

Figure 7:
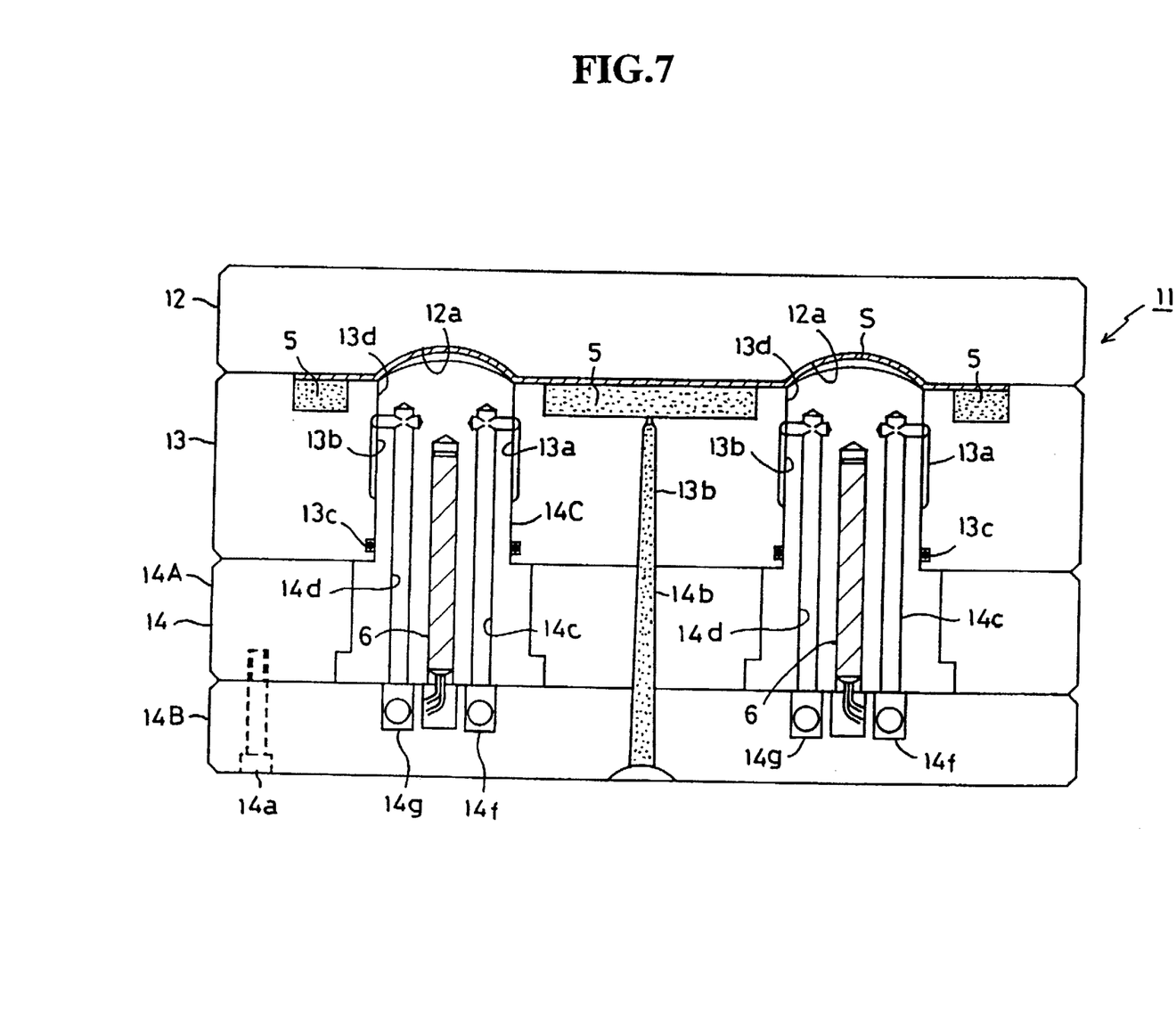
Figure 8:
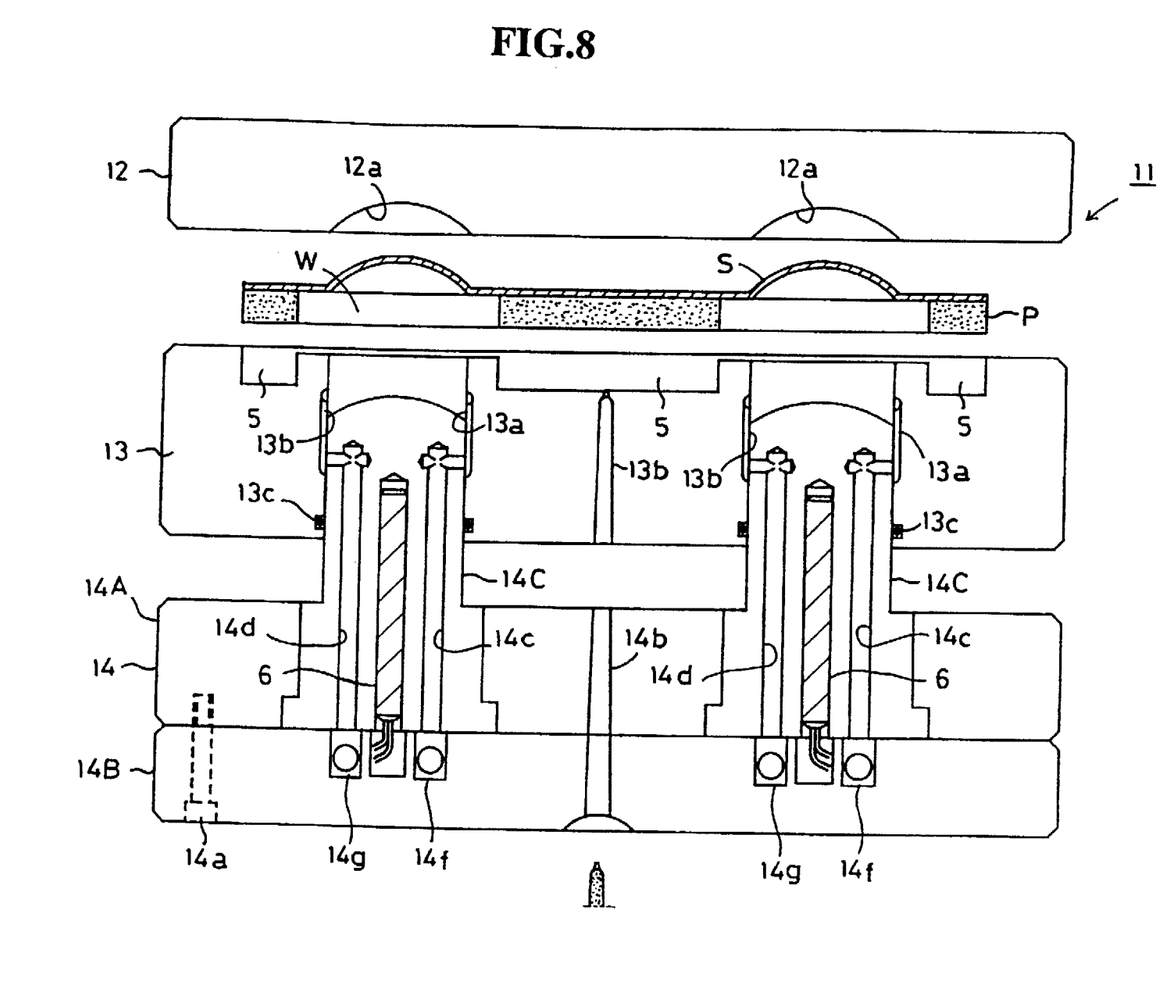

As the cores 14C further move upward through the holes 13d, the air remaining in the space 7, while serving as an air cushion, pushes the decorative sheet S soften by heating, thereby pushing the decorative sheet S onto the recesses 12a of the cavity plate 12 to transfer the embossments. The tip of the core 14C does not contact the decorative sheet S at that time. Continuously, the nozzle of the injection molding machine is connected to the spree 14b in the core plate 14, and the resin is injected into the cavity 5 through the sprue 13 as the injection operation. Finally, as shown in FIG. 8, the cavity plate 8 and the movable plate 8 is separated, and the sheet button panel assembly P, as a cooled and solidified molded article, is taken out to complete the series of operations.

As described above, in this making method for sheet button panel assembly, the core 14C does not contact the decorative sheet S. The decorative sheet S is pushed by air, so that the air can prevent the sheet button panel from being exerted with excessive force.

Figure 9:
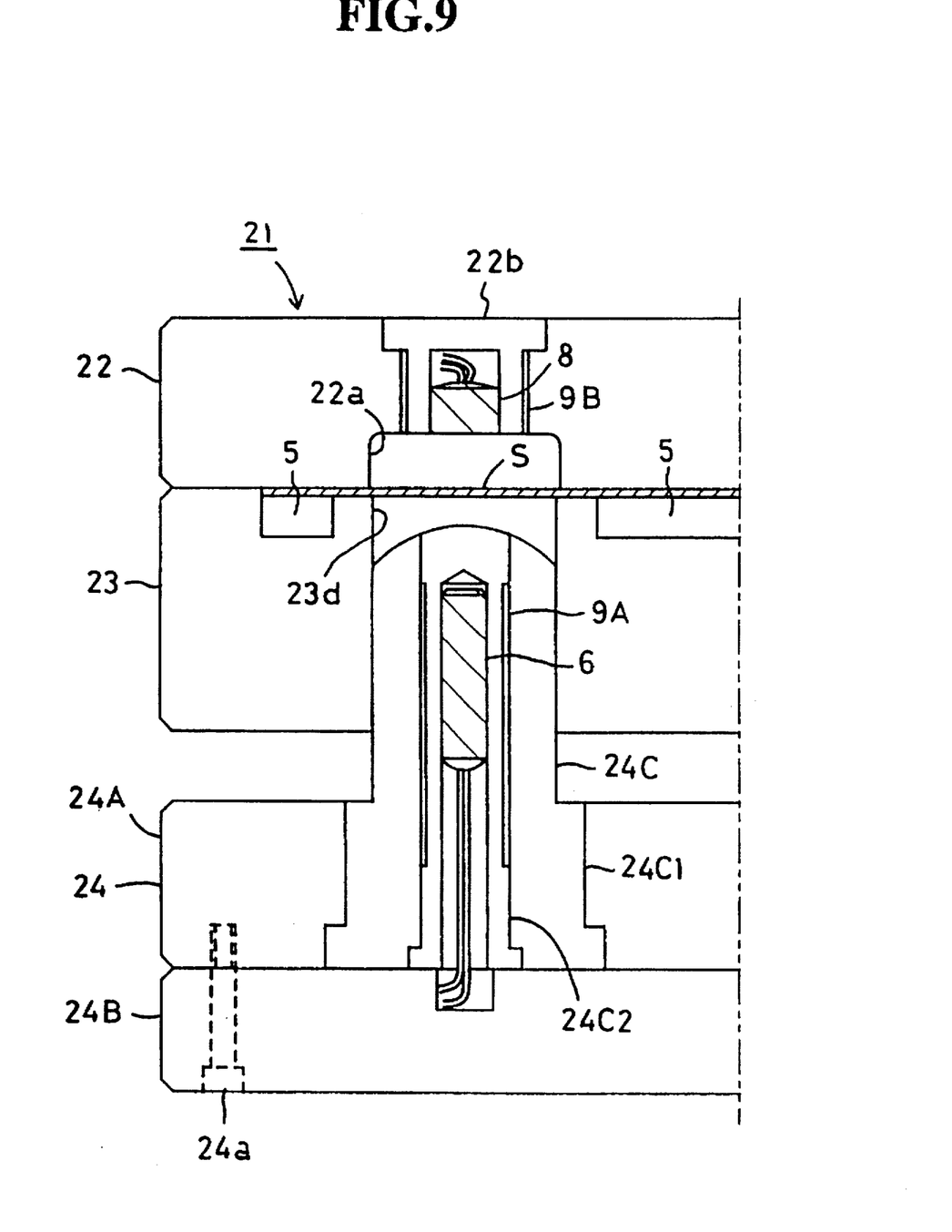
FIGS. 9 and 10 are side cross sections showing a metal mold used in a method for making a sheet button panel assembly according to the third embodiment of the invention.
Figure 10:
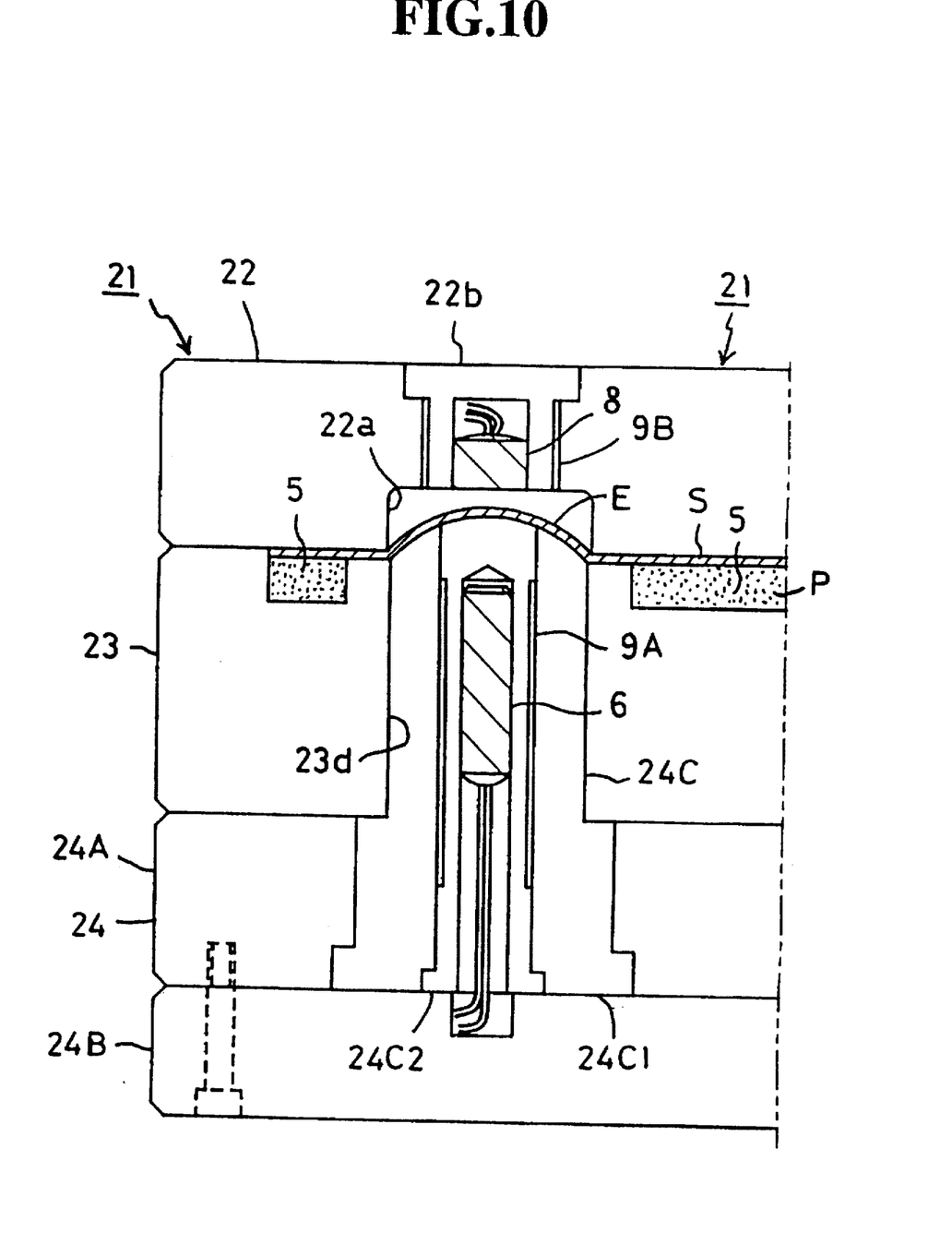

Referring to FIGS. 9, 10, a third preferred embodiment of the invention is described. In the third embodiment, the decorative sheet S is heated not by the air but by radiant heat from a metal mold 21. FIGS. 9, 10 show side cross sections of the metal mold in the third embodiment.

As shown in FIG. 9, the metal mold 21 has a cavity plate 22 serving as the first mold as in the first or second embodiment, a movable plate 23 constituting a part of the second mold, and a core plate 24 also constituting a part of the second mold.

The cavity plate 22 is formed with escaping spaces 22a for escaping the embossed portions when the decorative sheet S is to be embossed. A hole is bored at the bottom of each escaping space. A heater 8 is supported by a bracket 22b provided in the hole. A gap 9B is formed between the bracket 22b and the inner round face of the hole of the cavity plate 22.

The movable plate 23 has a single body structure as well as in the second embodiment. The movable plate 23 is formed with holes 23d into which cores 24C are inserted and a cavity 5 into which resin is injected.

The core plate 24 includes, as in the embodiments above, a first molding plate 24A, a second molding plate 24B, and a core 24C. The first molding plate 24A and the second molding plate 24B are secured to each other by bolts 24a.

The core 24C includes of an outer member 24C1 in a sleeve shape and an inner member 24C2 in a cylindrical shape. A heater 6 is built in the inner member 24C2. The outer periphery of the inner member 24C2 has a smaller diameter than the inner periphery of the outer member 24C1 except both ends of the inner member 24C2, thereby creating a gap 9A.

The operation of this embodiment is described using FIGS. 9, 10 as follows. As shown in FIG. 9, a decorative sheet S is set by clamping it with the cavity plate 22 and the movable plate 23. The two heaters 6, 8 are activated to heat, from upper and lower sides of the decorative sheet S, areas of the decorative sheet S at which embossments are to be made.

As shown in FIG. 10, then, the movable plate 23 and the core plate 24 are made to contact with each other to move the cores 24C inside the holes 23d, thereby embossing the decorative sheet S while the sheet S is transformed by the heat from the cores 24C. At that time, the gaps 9A, 9B prevent the heat of the heaters 6, 8 from transferring to the entire metal mold 21 and prevent the decorative sheet S from being heated unnecessarily. In this embodiment, the same injection mechanism is used and the same operation is done as in the first or second embodiment. The detailed description is therefore omitted for the sake of simplicity.

According to this embodiment, the radiant heat from the heaters 6, 8 directly heat the decorative sheet S. Therefore, since air is not used as heat medium, the mechanism of the apparatus can be made simple.

Figure 11:
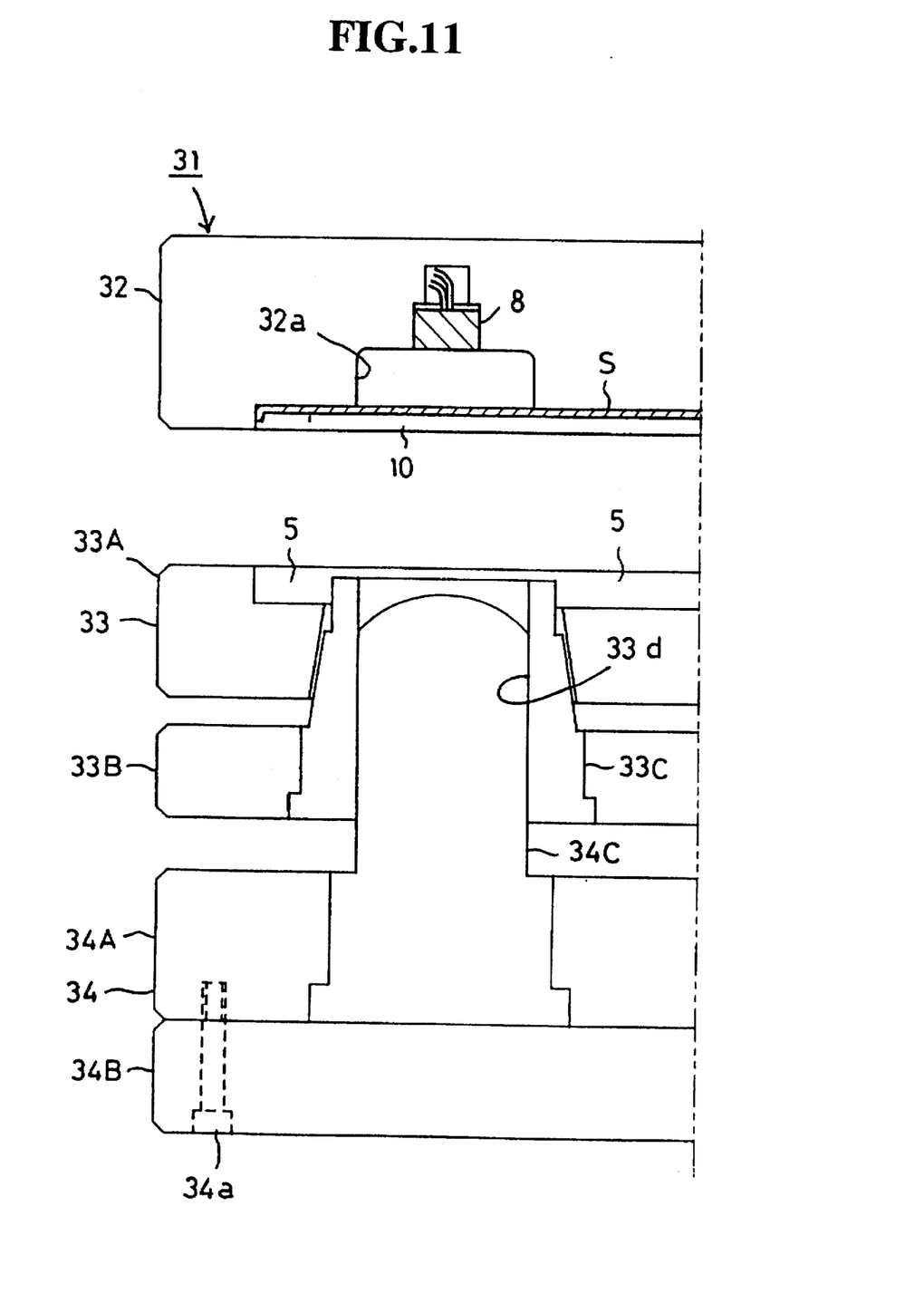
FIGS. 11 and 12 are side cross sections showing a metal mold used in a method for making a sheet button panel assembly according to the fourth embodiment of the invention.
Figure 12:
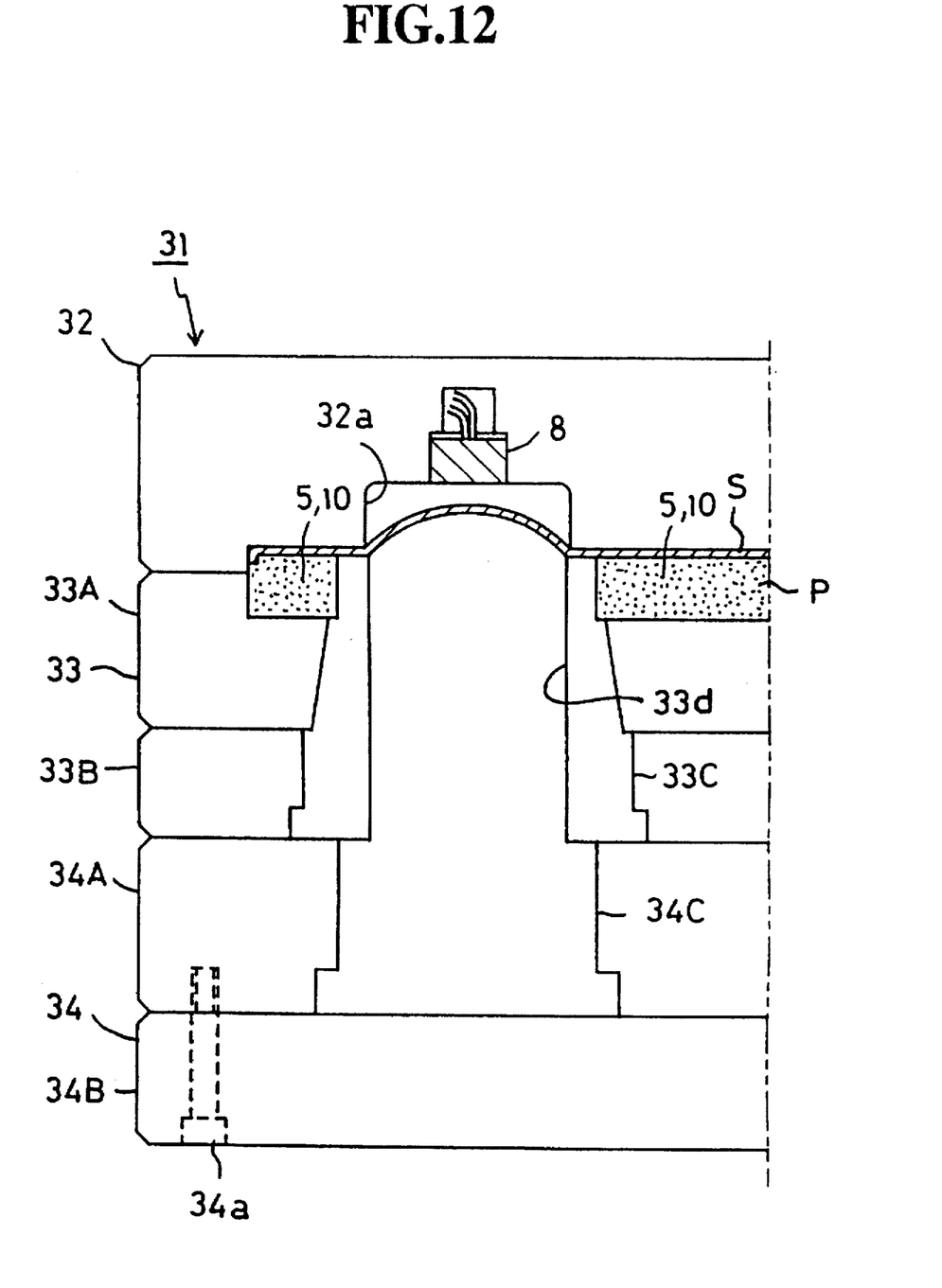

Referring to FIGS. 11, 12, there describes a fourth preferred embodiment of the invention. In the fourth embodiment, a metal mold 31 has a cavity plate 32 which supports a decorative sheet S, and a part of a movable plate 32 serves as a stripper plate used for ejecting the molded articles from the mold. FIGS. 11, 12 are side cross sections showing a metal mold structure of the fourth embodiment.

As shown in FIG. 11, the metal mold 31 has of a cavity plate 32 serving as the first mold as in the first or second embodiment, a movable plate 33 constituting a part of the second mold, and a core plate 34 also constituting a part of the second mold. The cavity plate 32 is formed with escaping spaces 32a for escaping the embossed portions when the decorative sheet S is to be embossed. A heater 8 is supported inside a hole bored at the bottom of each escaping space 32a. A first cavity 10 is formed at a parting line side of the cavity plate 32 for constituting space into which resin is introduced.

The movable plate 33 has a first molding plate 33A having, on the parting line side a second cavity 5 into which resin is introduced, a second molding plate 33B, located on the other side opposing the parting line side of first molding plate 33A as a body separable from the first molding plate 33A, and sleeves 33C secured to the second molding plate 33B. The first molding plate 33A and the second molding plate 33B are not fixed to each other; the first molding plate 33A can be projected toward the cavity plate 32 serves as a stripper plate for ejecting the panel assembly. The core plate 34 has, as in the embodiments above, a first molding plate 34A, a second molding plate 34B, and cores 34C. The first molding plate 34A and the second molding plate 34B are unitedly fixed to each other by bolts 34a. In this embodiment, the core 34C incorporates no heater; the decorative sheet S is heated only by the heaters 8 in the cavity plate 32.

As shown in FIG. 11, the heater 8 is activated while the decorative sheet S is supported in the first cavity 10 in the cavity plate 32, thereby heating the embossments portions of the decorative sheet S. As shown in FIG. 12, the movable plate 33 and the core plate 34 are made to meet each other to let the cores 34C further move into the holes 33d in the sleeves 33C, and then, the tips of the cores 34C transform the decorative sheet S to produce embossments E.

Then, resin is injected into the cavity constituted of the first cavity 10 and the second cavity 5 through the spree not shown, thereby forming a sheet button panel assembly P in which the decorative sheet S and the resin are united. After the resin is cooled and solidified, the first molding plate 33A of the movable plate 33 is projected toward the cavity plate 32 as a stripper plate, so that the sheet button panel assembly P is easily ejected from the sleeves 33C, and so that the molded article is easily taken out of the metal mold 31.

When the metal mold 31 according to the embodiment is thus used, the method for making the sheet button panel assembly is realized with excellent productivity in which the decorative sheet S is readily set to the cavity plate 32, and the molded article is easily taken out of the metal mold 31.

According to the invention, the decorative sheet is heated and embossed after being softened to some degree, so that the periphery of the embossment area is free of wrinkles. Further, the printed face is prevented from being damaged when the sheet is embossed, so that the method can form highly valuable sheet button panel assemblies with their handsome appearance. Since the decorative sheet S is embossed while the first and second mold contact the non-printed face of the decorative sheet, the mold does not directly contact the printed face of the sheet, so that the printed face is surely free of damage. When the heaters are provided in the mold, the heating step and the embossing step are done continuously, thereby improving its productivity and rendering the apparatus for this method compact. When warmed air is used as a heating medium, heating step can be easily adjusted, so that the quality control is easily handled.

It is to be noted that although in the first and second embodiments the heaters for warming air are built in the metal mold, the heaters can be provided outside the metal mold, and warmed air can be sent therefrom by a compressor or the like. Although in the first to fourth embodiments the movable plate for supporting the decorative sheet and the core plate for embossing the sheet, as the second mold, are separated, the movable plate and the core plate can be unified. The shape and number of the embossments in the embodiments are examples, and it is needless to say but arbitrary shapes and numbers can be chosen.

It is understood that although the present invention has been described in detail with respect to preferred embodiments thereof, various other embodiments and variations are possible to those skilled in the art which fall within the scope and spirit of the invention, and such other embodiments and variations are intended to be covered by the following claims.

What is claimed is:

1. A method for making a sheet button panel assembly, comprising:

clamping a first portion of a sheet by first and second molds;

embossing a second portion of said sheet by contacting only one of said first and second molds to said second portion of said sheet; and injecting resin into a cavity defined by said first portion of said sheet and either one of said first and second molds, such that said resin is provided only to said first portion of said sheet thereby forming said sheet button panel assembly, wherein one of said first and second molds is movable to clamp said first portion of said sheet in cooperation with the other of said first and second molds, said one of said first and second molds includes a core mold which projects into a recess formed in said other of said first and second molds to emboss said second portion of said sheet.

2. The method of claim 1, wherein said sheet has a decorative printing on one side thereof, and said embossing step includes the step of contacting said only one of said first and second molds to the other side of said sheet.

3. The method of claim 1, wherein said embossing step includes the step of heating at least said second portion of said sheet by a heater provided in at least one of said first and second molds.

4. The method of claim 1, wherein said embossing step includes a heating step to heat said second portion of said sheet before contacting said only one of said first and second molds with said second portion to form an emboss.

5. A method for making a sheet button panel assembly, comprising:

clamping a first portion of a sheet by first and second molds;

embossing a second portion of said sheet by contacting only one of said first and second molds to said second portion of said sheet; and injecting resin into a cavity defined by said first portion of said sheet and either one of said first and second molds, such that said resin is provided only to said first portion of said sheet thereby forming said sheet button panel assembly, wherein said embossing step includes the step of heating said sheet by heated air provided by an air passage built in at least one of said first and second molds.

6. The method of claim 5, wherein said heating step includes heating air by a heater provided in at least one of said first and second molds.

7. The method of claim 5, wherein said heating step includes heating said air by a heating apparatus provided outside said first and second molds.

8. A method for making a sheet button panel assembly, comprising:

clamping a first portion of a sheet by first and second molds;

embossing a second portion of said sheet by contacting only one of said first and second molds to said second portion of said sheet; and injecting resin into a cavity defined by said first portion of said sheet and either one of said first and second molds, such that said resin is provided only to said first portion of said sheet thereby forming said sheet button panel assembly, wherein one of said first and second molds is movable to clamp said first portion of said sheet in cooperation with the other of said first and second molds, the other of said first and second molds includes a core mold which provides air to a space defined at least by said second portion of said sheet and said core mold, such that the air presses the second portion toward a recess in said one of said first and second molds to emboss said second portion of said sheet.

* * * * *